United States Patent Office 3,247,016
Patented Apr. 19, 1966

3,247,016
FLAMEPROOFING OF TEXTILE MATERIALS
Richard F. Zimmerman, Buffalo, Paul E. Hoch, Youngstown, and George M. Wagner, Lewiston, N.Y., assignors to Hooker Chemical Corporation, Niagara Falls, N.Y., a corporation of New York
No Drawing. Filed Sept. 26, 1961, Ser. No. 140,694
40 Claims. (Cl. 117—137)

This invention is directed to a composition of matter for treating textile materials, to a process for the preparation of flame retardant textile materials, to the textile materials produced thereby, and to flame retardant cellulosic materials chemically modified by the above mentioned compositions.

Methylol-phosphorus polymers which have nitrogen atoms incorporated in the polymer are known to have excellent flame retarding properties. Such polymers are particularly suitable in the treatment of textile materials and especially cellulosic textile materials which are porous in nature and therefore are readily capable of absorbing resinous impregnating compositions. Such materials as cotton, rayon, wool, jute and ramie textiles as well as paper, cardboard, etc., serve as suitable bases upon which the above mentioned methylolphosphorus polymers can be impregnated. Numerous processes have been developed for treating cellulosic materials with these polymers.

For example, in one process a cellulosic material, such as cotton cloth, is impregnated with an aqueous resin solution containing tetrakis(hydroxymethyl)phosphonium chloride and methylolmelamine, the impregnated cloth is dried and then reacted with ammonium hydroxide. Although this technique may be employed to produce a flame-proof cloth, nevertheless, the resulting cloth has a hard finish since the reaction between ammonia and the methylol-phosphorus polymer is extremely rapid and a hard, nitrogen-containing polymer forms on the surface of the cloth. This hard polymer blocks or prevents further reaction of ammonia with the methylol-phosphorus polymer on the interior of the cloth fibers. As a result the distribution of the polymer on the cloth is not uniform. Furthermore such a process is undesirable from a commercial standpoint since the cloth must be treated with separate solutions, and two separate drying steps must be employed.

In another process the cloth to be treated is impregnated with an aqueous solution containing tetrakis (hydroxymethyl)phosphonium chloride, methylol melamine, and ammonium hydroxide, and the resulting impregnated fabric is then dried in air. Such a technique is suitable for treating clothing and the like in the field to render the clothing flame-proof and impervious to certain warfare gases. However, this technique is not suitable for treating cellulosic materials on a commercial scale because of the rapid solidification of the polymer when ammonia is contacted with tetrakis(hydroxymethyl)phosphonium chloride.

In these and other similar reactions wherein polymers containing nitrogen and phosphorus are formed from tetrakis(α-hydroxyorgano)phosphonium chloride compounds and nitrogen-containing compounds, the rapid rate of polymerization has created serious problems when these processes are tried on a commercial scale. While we do not wish to be necessarily bound by theory, it is believed that the rapid rate of polymerization in these processes is caused, at least in part, by the presence of an aldehyde, such as formaldehyde, which is formed during some stage of the polymerization reaction. We have discovered that when an aldehyde-combining sulfite compound is admixed with the hydroxyorgano phosphonium chloride compound, either prior to or simultaneously with the reaction of the phosphonium compound with a nitrogen-containing compound, a marked inhibition of the rate of polymerization is obtained. In addition when thiourea is employed as a component of the resin solution and this solution is applied to cellulosic materials and cured, the flame-retarding properties of the resulting resin, and of course the fabric upon which the resin is coated and/or impregnated, are markedly improved.

One of the objects of this invention is to provide a process for the preparation of flame retardant textile materials.

Another object of this invention is to provide a novel composition which is capable of both inhibiting the formation of polymers containing phosphorus and nitrogen in too rapid a fashion, and providing improved fire resistance in cellulosic fabrics impregnated therewith, while at the same time insuring the desired properties of improved durability and higher tear strength with the requisite tensile strength being present in the resin impregnated cellulosic material.

A further object of this invention is to provide cellulosic materials with improved flame-resistance.

Still another object of the invention is to provide a method of decreasing the rate of reaction between hydroxyorgano phosphonium chloride compounds and nitrogen-containing salts while at the same time insuring the production of a polymeric composition which will impart durable fire-resisting characteristics to the textile fabric upon which it is impregnated.

Another object of the invention is to provide flame retardant cellulosic materials having improved hand and other physical properties.

It is another object of the invention to provide resin coated and/or impregnated cellulosic textile materials which retain their flame-retardant characteristics after frequent launderings.

A further object of this invention is to provide a stable solution for rendering cellulosic materials flame-retardant.

It has now been discovered that when a sulfite material capable of combining with an aldehyde is admixed with a hydroxyorgano phosphonium chloride compound having the formula:

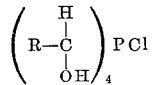

where R is as defined below, and the resulting mixture is reacted with a nitrogen-containing compound, such as methylolmelamine, to yield a polymer containing nitrogen and phosphorus, there is a marked inhibition of the rate of polymerization. When, along with the above mentioned materials, thiourea is included in the above mentioned mixture, there results an extremely fire-resistant polymer material which retains its fire-retardant properties despite laundering, while at the same time retaining the desired hand, durability, tear strength and tensile strength which are sought in cellulosic textile fabrics. In addition, the substance capable of combining with an aldehyde may be admixed simultaneously with the hydroxyorgano phosphonium chloride compound, the nitrogen-containing compound and thiourea, thus providing a procedural advantage of a single mixing.

Because of the polymerization inhibiting effect of the mixture of the hydroxyorgano phosphonium chloride compound and the aldehyde-combining substance, aqueous solutions containing this mixture, thiourea, and a nitrogen-containing compound, such as trimethylolmelamine, are highly stable and do not readily polymerize or solidify unless subjected to an elevated temperature. As a result, it is now possible to impregnate cellulosic materials with aqueous solutions containing hydroxyorgano phosphonium chloride compounds, the aldehyde-combining substance, thiourea, and the nitrogen-containing compound, and thereby attain a more complete penetration of the cellulosic material with the resulting polymer thereby insuring more homogeneous distribution of the fire-resistant polymer material upon the fabric substrate.

It has been further discovered that flame-retardant cellulosic materials having improved physical properties can be prepared by impregnating the cellulosic material with an aqueous resin solution containing (1) a hydroxyorgano phosphonium chloride compound having the formula defined below, (2) a water-soluble, cyclic nitrogen-containing compound; (3) a sulfite compound capable of combining with an aldehyde; (4) thiourea; and (5) a material selected from the group consisting of: (A) a nitrogen-containing salt of a strong inorganic acid, (B) a strong inorganic acid salt of a material selected from the group consisting of magnesium, zinc and tertiary amines, and (C) mixtures of (A) and (B), and then drying and curing the resulting resin-impregnated cellulosic material.

In order to secure the advantages of the present invention the polymer containing nitrogen and phosphorus must be formed by reacting the following materials: (1) a hydroxyorgano phosphonium chloride compound; (2) a polymerization inhibiting sulfite compound capable of combining chemically with an aldehyde; (3) a nitrogen-containing compound; (4) thiourea; (5) a polymerization catalyst selected from the group consisting of (A) a nitrogen-containing salt of a strong inorganic acid, (B) a strong inorganic acid salt of a material selected from the group consisting of: magnesium, zinc, and tertiary amines, and (C) mixtures of (A) and (B). It should be noted here that the polymerization catalyst can be formed in situ during or before the polymerization reaction takes place by adding materials which would form the salt(s) indicated above as (A), (B), or (C). The said catalyst should be present at the onset of polymerization however.

The term "hydroxyorgano phosphonium chloride compound" is used throughout this specification to define water-soluble tetrakis-(α-hydroxyorgano) phosphonium chloride compounds having the formula:

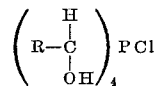

where R is selected from the group consisting of hydrogen, lower alkyl groups having between one and about three carbon atoms, chlorinated lower alkyl groups having between one and about three carbon atoms, lower alkenyl groups having from two to three carbon atoms, and lower chlorinated alkenyl groups having from two to three carbon atoms. Typical examples of suitable water-soluble hydroxyorgano phosphonium chloride compounds are: tetrakis-(hydroxymethyl)phosphonium chloride; tetrakis-(α-hydroxyethyl)phosphonium chloride; tetrakis(α-hydroxypropyl)phosphonium chloride; tetrakis(α-hydroxypropenyl)phosphonium chloride; tetrakis(α-hydroxybutenyl)phosphonium chloride; etc. Mixtures containing two or more of the above mentioned water-soluble hydroxyorgano phosphonium chloride compounds can likewise be used. The hydroxyorgano phosphonium chloride compound can be used in monomer form or in a partially polymerized form prior to reacting it with the copolymerizable water-soluble cyclic nitrogen-containing compound, as long as the hydroxyorgano phosphonium chloride is still water-soluble. For example, tetrakis (hydroxymethyl) phosphonium chloride may be heated to effect partial polymerization thereof before dissolving in the aqueous solution and contacting with the copolymerizable water-soluble cyclic nitrogen-containing compound. Suitable sulfite substances capable of combining with an aldehyde (the aldehyde produced as a by-product of polymerization of a hydroxyorgano phosphonium chloride compound with a copolymerizable nitrogen-containing compound) include: inorganic sulfites; organic sulfites such as tertiary amine sulfites; and mixtures of two or more of any of the above materials.

Typical examples of suitable inorganic sulfites include: ammonium sulfite, ammonium bisulfite, sodium sulfite, sodium bisulfite, potassium sulfite, potassium bisulfite, lithium sulfite, lithium bisulfite, and mixtures thereof. Alkaline earth metal sulfites such as calcium sulfite, calcium bisulfite, barium sulfite, barium bisulfite, magnesium sulfite, etc., can be employed as well as mixtures of two or more of the above alkaline earth metal sulfites.

Typical examples of suitable tertiary amine sulfites include: the sulfites and bisulfites of triethanolamine, triisopropyl amine, triethylamine, tripropanolamine, tributylamine; and mixtures thereof.

The term "sulfite" as used throughout the description and claims is intended to include sulfites, bisulfites, and mixtures thereof.

The desired polymerization inhibiting effect, such as produced by the above mentioned sulfite compounds, can also be obtained by contacting gaseous sulfur dioxide with an aqueous solution containing a hydroxyorgano phosphonium chloride compound under alkaline conditions sufficient to convert $SO_2$ to the sulfite ion.

The sulfite substance capable of combining with an aldehyde is admixed with the hydroxyorgano phosphonium chloride compound in a proportion equivalent to between about 0.9 and about two moles, and preferably between about one and about 1.4 moles of the sulfite compound per mole of the hydroxyorgano phosphonium chloride compound. However, any amount of sulfite capable of inhibiting the polymerization of the hydroxyorgano phosphonium chloride compound can be employed.

The polymerization inhibiting effect, obtained by admixing a hydroxyorgano phosphonium chloride compound with one of the aforesaid sulfite substances can be utilized in any polymerization technique where the rapid rate of polymerization of the hydroxyorgano phosphonium chloride compound or its derivatives with a nitrogen-containing compound creates processing problems. For example, when an aqueous solution containing a hydroxyorgano phosphonium chloride compound, such as tetrakis(hydroxymethyl)phosphonium chloride; a sulfite compound capable of combining with an aldehyde, such as sodium sulfite; and a water-soluble, nitrogen-containing compound, copolymerizable with said hydroxyorgano phosphonium chloride compound such as polyfunctional cyclic methylolated copolymerizable nitrogen-containing compounds, e.g., trimethylolmelamine and a catalyst material of the type (A), (B), or (C) as defined above, is impregnated onto a cellulosic material such as a cellulosic textile; the rate of polymerization is markedly inhibited thereby permitting substantially complete penetration of the impregnating composition onto the cellulosic textile before polymerization thereof reaches the state of completion. As a result the nitrogen-phosphorus polymer which forms is substantially completely distributed throughout the fibers of the cellulosic textile in a homogeneous manner.

When thiourea is included in the above mentioned solution and the said solution containing thiourea is later subjected (after substantial impregnation of the cellulosic fabric substrate has been effected), to polymerization in the presence of the polymerization catalyst (A), (B) or (C) as set forth above there is produced a cellulosic fabric possessing marked resistance to burning (as shown by the conventional one-quarter inch match test), even after repeated launderings. Yet at the same time the fabric so treated has improved durability, higher tear strength, and satisfactory tensile properties while still retaining the relatively soft hand (feel) of the original untreated fabric.

Thus by employing the composition and method of the present invention it is possible to secure fire-resistant fabrics displaying overall performance characteristics previously unattainable by the use of prior art impregnating compositions and procedures.

As a result of retarding the onset of polymerization (and avoiding the difficulties present in too rapid a polymerization reaction), the nitrogen-phosphorus-thiourea containing polymer which forms is substantially completely distributed throughout the fibers of the cellulosic textile. The complete homogeneous distribution of the resulting polymer on the textile in this fashion markedly services to physically improve the overall flame-proofing properties of the textile and further assist in imparting uniform hand and texture to the resulting treated textile.

As the copolymerizable nitrogen-containing compound which polymerizes with the hydroxyorgano phosphonium chloride compound, water-soluble, cyclic, nitrogen-containing compounds are preferred. Water-soluble cyclic nitrogen-containing compounds suitable for use in the instant invention include triazines and dimethylol cyclic alkylene ureas. Typical examples of such triazines include: methylol melamines; polymethylol melamines; dimethylol triazones; modified methylol melamines, such as the trimethyl ether of methylol melamine; and mixtures thereof. Typical examples of suitable cyclic alkylene ureas include dimethylolethylene urea, dimethylolpropylene urea, etc.

The polymerization catalyst material is selected from the group consisting of: (A) a nitrogen-containing salt of a strong inorganic acid; (B) a strong inorganic acid salt of a material selected from the group consisting of: magnesium, zinc, and tertiary amines; and (C) mixtures of (A) and (B).

Suitable nitrogen-containing salts of strong inorganic acids which can be used as polymerization catalysts according to the present invention include: ammonium salts of strong acids; primary amine salts of strong acids; aromatic amine salts of strong acids; and cyclic amine salts of strong acids. Strong inorganic acids capable of yielding the nitrogen-containing salts as contemplated in the instant invention include: sulfuric acid; phosphoric acid; hydrochloric acid; hydrobromic acid; hydroiodic acid; nitric acid; etc. Mixtures of any two or more of the above mentioned acids can likewise be employed.

Typical examples of suitable ammonium salts of strong acids include: ammonium sulfate; ammonium phosphate; ammonium chloride; ammonium bromide; ammonium iodide; ammonium nitrate; mixtures thereof; etc. Typical examples of suitable primary amine, aromatic amine, and cyclic amine salts of strong inorganic acids include: ethanolamine-sulfuric acid, hydrazine dihydrochloride, alkylamine salts of the aforesaid strong inorganic acids wherein the alkyl groups contain between one and about twenty carbon atoms, aniline salts of the aforesaid strong inorganic acids, and cyclohexylamine salts of the aforesaid strong inorganic acids.

In order to achieve a cellulosic fabric material possessing the highly desired overall performance characteristics set forth above, it is necessary to employ thiourea to produce the resinous compositions. Thiourea can be employed in a proportion of from about one to about ten percent by weight of the aqueous resin solution. Preferably thiourea is employed in amounts of between about 2.5 and ten percent by weight in order to achieve the most desirable impregnating resinous compositions. An important economic advantage, achieved by the use of thiourea in the resinous compositions according to the present invention, resides in the fact that by using thiourea the amount of relatively expensive hydroxyorganophosphonium chloride compound which is employed can be lowered.

Therefore it is economically significant that applicants are able to prepare cellulosic fabrics displaying the above mentioned overall performance characteristics while at the same time employing a high level of relatively inexpensive material, viz., thiourea, and at the same time decrease the amount of relatively expensive hydroxyorgano phosphonium chloride compound which is necessary to prepare fabric impregnating compositions having the desired flame retarding properties.

In a preferred embodiment of the present invention a novel cellulosic fabric impregnating resinous composition suitable for rendering cellulosic materials flame retardant, etc., is prepared by admixing a tetrakis($\alpha$-hydroxyorgano) phosphonium chloride compound as defined hereinabove; a sulfite compound capable of combining with an aldehyde; a water-soluble, cyclic, nitrogen-containing copolymerizable compound; a polymerization catalyst selected from the group consisting of: (A) a nitrogen-containing salt of a strong inorganic acid, (B) a strong inorganic acid salt of a material selected from the group consisting of: magnesium, zinc, and tertiary amines; and (C) mixtures of (A) and (B); thiourea; and water. The resulting resin solution, which polymerizes gradually upon heating, is then used to impregnate cellulosic materials such as cellulosic textiles, and the resin impregnated material is dried and cured.

The approximate proportions of the aforesaid components used in preparing the aqueous resin solutions are as follows—

| Component: | Proportion |
|---|---|
| Hydroxyorgano phosphonium chloride compound | 10 to 30 percent by weight. |
| Cyclic nitrogen-containing copolymerizable compound | 5 to 15 percent by weight. |
| Polymerization catalyst salt (nitrogen-containing salt of a strong inorganic acid; or strong inorganic acid salt of a material selected from the group consisting of magnesium, zinc, and tertiary amines) | 1 to 10 percent by weight. |
| Thiourea | 2.5 to 10 percent by weight (preferably 5.0 to 7.5 percent by weight). |
| Sulfite compound capable of combining with an aldehyde | 0.9 to 2.0 moles of sulfite compound per mole of hydroxyorgano phosphonium chloride compound. |
| Water | 35 to 80 percent by weight. |

The aqueous resin solution is prepared by admixing the aforesaid non-aqueous components with water, employing sufficient agitation to substantially completely dissolve all of the non-aqueous components. Any convenient order of mixing the components of the aqueous resin solution can be employed. For example, the non-aqueous components may be added simultaneously to the water with agitation. When a nitrogen-containing salt of a strong inorganic acid is employed as a catalyst component of the aqueous resin solution, the other non-aqueous components are first dissolved in water and the nitrogen-containing salt of a strong inorganic acid is then dissolved in the aqueous solution. A distinct procedural advantage attendant to the use of the composition of the present invention resides in the fact that all of the polymerizable ingredients, including thiourea, can be simultaneously present in the same reaction vessel and yet the polymerizable mixture possesses marked stability. This is a distinct advantage in treating textiles since the aqueous polymerizable solution can be prepared at one time and then used later. The aqueous polymerizable solution is stable and may be stored for relatively lengthy periods of time before any noticeable degree of polymerization occurs within the aqueous solution. This is thought to be especially surprising since this stability is present even when the polymerization catalyst is included in the said polymerizable solution.

Instead of using either the nitrogen-containing salt of a strong inorganic acid, or the strong inorganic salt of a material selected from the group consisting of magnesium, zinc, and tertiary amines; both of these catalyst salts can be used in conjunction with one another as a combined catalyst system to achieve the desired polymerization reaction. For example the nitrogen-containing salt of a strong inorganic acid can be added to the aqueous resin solution of polymerizable materials in proportions sufficient to effect the polymerization thereof. Then the strong inorganic acid salt of magnesium, zinc, or a tertiary amine, can be added to supplement or replace the partially spent (partially consumed) nitrogen-containing salt of a strong inorganic acid. This combined catalyst system will provide sufficient catalysis to effect complete polymerization of the aforesaid hydroxyorgano phosphonium chloride compounds, cyclic nitrogen-containing compounds, and thiourea. As an alternative procedure, the two catalyst salts (A) and (B) can be mixed together with the polymerizable materials, sulfite compound, and water when the original polymerizable solution is initially prepared.

When the nitrogen-containing salt of a strong inorganic acid is employed as the sole catalyst salt, it is preferable to employ about fifty to about seventy percent of water by weight of the aqueous polymerizable solution. In such a polymerization the proportion of polymerizable nitrogen-containing compounds to hydroxyorgano phosphonium chloride compounds is preferably about 0.05 to about 0.15 gram/atom of nitrogen per mole of hydroxyorgano phosphonium chloride compound. The proportion of sulfite compound to hydroxyorgano phosphonium chloride compound is preferably about 1.4 moles of sulfite per mole of hydroxyorgano phosphonium chloride compound. In this polymerization the percentage of nitrogen-containing salt of a strong inorganic acid based on the hydroxyorgano phosphonium chloride compound is preferably from about ten to about thirty percent by weight. The preferred resin add-on percent (dry basis) is from about nine percent to about thirty percent.

When the polymerization catalyst is a strong inorganic salt of magnesium, zinc, or a tertiary amine employed alone, it is preferable to employ water in the percentage distribution so that about forty-five percent to about fifty-five percent by weight of the aqueous resin solution is water. In this polymerization reaction the magnesium, zinc, or tertiary amine salt of the strong inorganic acid is preferably employed in an amount of about five to about twenty percent by weight of the hydroxyorgano phosphonium chloride compound. The proportions of sulfite to hydroxyorgano phosphonium chloride compound and polymerizable nitrogen-containing compound to hydroxyorgano phosphonium chloride compound, and the resin add-on percent (dry basis) are the same percentages and proportions indicated above with respect to polymerizations catalyzed with the use of the nitrogen-containing salt alone.

Greater or lesser proportions of the aforesaid ingredients can be employed as long as the rate of polymer formation is sufficiently gradual to yield a uniform polymer on the cellulosic material, and as long as the impregnating solution contains sufficient resin to provide the cellulosic material with an adequate resin add-on.

Various techniques can be employed for impregating textile fabrics with the aqueous resin solution. In one embodiment of the invention, the hydroxyorgano phosphonium chloride compound, copolymerizable cyclic nitrogen-containing compound, sulfite compound, catalyst salt, and thiourea are dissolved in the water simultaneously, and the resulting aqueous polymerizable solution is fed to a suitable container such as a padding box. The textile or other material to be treated is immersed in the resulting solution. After the cellulosic material is impregnated with the aqueous polymerizable solution, it is fed through a squeeze roll or other means for removing excess solution. The textile impregnated with the aqueous solution may be heated or otherwise treated to remove excess water and to effect polymerization of the resin in situ on the textile as well as to effect curing of the said resin.

Drying of the treated cloth can be effected in a conventional forced hot air oven at a temperature between about ninety and about one hundred and ten degrees centigrade for between about one and about ten minutes. Curing of the resin can be effected in the same apparatus at a temperature of between about one hundred and twenty and about one hundred and fifty degrees centigrade for between about one and about ten minutes. The resin curing temperature could be the same temperature as that employed to cause polymerization of the aforementioned polymerizable aqueous solution, and in such a case the polymerization, drying and curing would be done in one operation simultaneously. However, any temperature and time conditions under which substantially all of the polymerizable components of the said aqueous solution are polymerized, can be satisfactorily employed.

The same is true with regard to the temperature and time conditions required for drying the textile fabric in that any temperature and time conditions under which all of the free water is removed and the resin cured, can be employed in the practice of this invention.

For example, the dry resin-coated textile can be cured in an infrared oven where the treated cloth is exposed to an elevated temperature, for example, between about five hundred and about seven hundred degrees Fahrenheit for between about five and about ten seconds. On the other hand the resin impregnated textile may be stored under atmospheric conditions overnight to effect drying of the cloth and curing of the resin when the aqueous resin solution contains a relatively high proportion of catalyst, for example between about five and about ten percent by weight.

After drying and curing, the resin-impregnated cellulosic textile is then scoured (washed) to remove excess sulfite, unpolymerized materials, and the anions of the catalyst salt. Scouring of the treated material may be effected by immersing the treated cellulosic textile in an aqueous soap solution containing a small proportion of soap and a small proportion of sodium carbonate. The scoured resin-treated textile is then dried in a manner such as indicated above.

The polymer or resin which impregnates the cellulosic textile material is the reaction product of the hydroxyorgano phosphonium chloride compound, the cyclic copolymerizable nitrogen-containing compound, the catalyst salt and thiourea. When a cellulosic material is impregnated with the resinous material in accordance with the present invention employing polymerizable resin forming ingredients in the proportions set forth above, the resinous material is the reaction product formed from resin forming ingredients comprised of the hydroxyorgano phosphonium chloride compound in a proportion equivalent to between about twenty and about eighty-five percent; the cyclic copolymerizable nitrogen-containing compound in a proportion equivalent to between about two and about forty percent by weight; and thiourea in a proportion equivalent to between about one and about forty percent by weight of the resin forming ingredients.

In one embodiment of the present invention wherein the catalyst salt is a nitrogen-containing salt of a strong inorganic acid, such as ammonium sulfate; an aqueous solution of the hydroxyorgano phosphonium chloride compound, the cyclic copolymerizable nitrogen-containing compound, the sulfite compound, and thiourea is prepared in the preferred proportions defined above. The cellulosic material is impregnated with this solution. Then the impregnated material is sprayed with the said catalyst solution.

Any suitable concentration of catalyst can be employed to prepare the aqueous catalyst solution, but it is preferred to use an aqueous solution containing between about twenty-five and about forty percent by weight of the nitrogen-containing salt of a strong acid. A sufficient amount of this solution is contacted with the impregnated cellulosic material to provide the nitrogen-containing salt in a proportion equivalent to between about ten and about twenty-five percent by weight of the resin-forming ingredients on the cellulosic material.

Since the sulfite compound inhibits rapid reaction between the nitrogen-containing compound and the hydroxyorgano phosphonium chloride compound, the cellulosic material is substantially completely impregnated with the aqueous catalyst solution of the nitrogen-containing salt of a strong acid, thereby catalyzing the in-situ polymerization of the polymerizable ingredients in the previously applied aqueous resin forming solution. Thus the polymer produced on the cellulosic material is a polymer of substantially uniform composition throughout the cellulosic material.

In direct contrast thereto when an aqueous ammonia-containing solution is sprayed on cellulosic materials impregnated with a methylol-phosphorus polymer in the absence of a sulfite compound, such as is performed in certain prior art procedures; rapid formation of the nitrogen-containing methylol-phosphorus polymer occurs on the outer surface of the material which in turn inhibits complete reaction of the nitrogen compound with the methylol-phosphorus polymer on the interior surfaces of the fiber, viz., those areas of the cellulosic fabric which are remote from the outer surfaces thereof. Furthermore, in prior art techniques the resin-impregnated cellulosic material must be dried before spraying the ammonia-containing solution onto the cellulosic fabric.

However, according to the present invention, drying of the resin-impregnated cellulosic material is not necessary before spraying with the catalyst solution.

In another modification of this invention, the cellulosic material is impregnated with an aqueous solution containing a hydroxyorgano phosphonium chloride compound, a copolymerizable cyclic nitrogen-containing compound, a sulfite compound, and thiourea. The impregnated cellulosic material is then passed through squeeze rolls, where one or both of the rolls are in contact with the catalyst solution. When this technique is employed, the catalyst salt is squeezed into the cellulosic material containing the polymerizable hydroxyorgano phosphonium chloride compound, copolymerizable cyclic nitrogen-containing compound and thiourea, and a uniform polymer is thereby formed when the thus impregnated cellulosic fabric is subjected to the heating conditions such as those indicated above.

According to one of the preferred embodiments of this invention an aqueous resin-forming solution is prepared from the following components in the following proportions—

| Component: | Proportion |
|---|---|
| Tetrakis(hydroxymethyl)phosphonium chloride | 10 to 30 percent by weight. |
| Trimethylolmelamine | 5 to 15 percent by weight. |
| Ammonium sulfate | 1 to 10 percent by weight. |
| Thiourea | 2.5 to 10.0 percent by weight. |
| Sodium sulfite | 1.0 to 1.4 moles of sodium sulfite per mole of tetrakis (hydroxymethyl) phosphonium chloride. |
| Water | 40 to 80 percent by weight. |

When an ammonium compound is added to an aqueous solution of a hydroxyorgano phosphonium chloride compound in the absence of a sulfite compound, the time required for the entire mass to polymerize and solidify is generally but a few minutes. This short period of time allows little time for thorough and homogeneous impregnation of the rapidly forming resin onto the fabric.

When a sulfite is added to the solution in accordance with one of the aspects of the instant invention as described above, the time required for polymerization and solidification of the resin is extended for a much longer period of time, e.g., up to about six hours or more. As a result the cellulosic material can be thoroughly impregnated with the polymerizable constituents before the solid nitrogen-phosphorus-thiourea containing polymer is formed.

According to another preferred embodiment of the instant invention (wherein a strong inorganic acid salt of magnesium, zinc, or a tertiary amine is employed as the salt catalyst), an aqueous resin solution is prepared from the following components in the following proportions—

| Component: | Proportion |
|---|---|
| Tetrakis(hydroxymethyl)phosphonium chloride | 10 to 30 percent by weight. |
| Trimethylolmelamine | 5 to 15 percent by weight. |
| Magnesium chloride | 1 to 10 percent by weight. |
| Water | 45 to 55 percent by weight. |
| Thiourea | 2.5 to 10 percent by weight. |
| Sodium sulfite | 0.9 to 1.4 moles of sodium sulfite per mole of tetrakis(hydroxymethyl)phosphonium chloride. |

An additional preferred embodiment of the invention (wherein the polymerization catalyst comprises a combined catalyst system employing both a nitrogen-containing salt of a strong inorganic acid and a strong inorganic acid salt of magnesium, zinc, or tertiary amines) is prepared in the form of an aqueous polymerizable solution from the following components present in the following proportions—

| Component: | Proportion |
|---|---|
| Tetrakis(hydroxymethyl) phosphonium chloride | 10 to 30 percent by weight. |
| Trimethylolmelamine | 5 to 15 percent by weight. |
| Magnesium chloride | 1 to 10 percent by weight. |
| Water | 45 to 55 percent by weight. |
| Thiourea | 2.5 to 10 percent by weight. |
| Ammonium sulfate | Up to 0.15 gram-atom of nitrogen as ammonium sulfate per mole of tetrakis(hydroxymethyl) phosphonium chloride. |
| Sodium sulfite | 0.9 to 1.4 moles of sodium sulfite per mole of tetrakis(hydroxymethyl) phosphonium chloride. |

Cellulosic textiles treated in accordance with the present invention have improved hand, improved tear strength, satisfactory tensile strength, improved flame-retardance, etc. These well balanced properties, as well as others enumerated hereinabove, can be obtained with a smaller proportion of resin add-on than is required by previously known techniques. This is in part due to the ability of the compositions of the present invention to be homogeneously distributed upon the cellulosic textile substrate before the polymerization thereof has been carried to a substantial degree of completion.

The following examples are presented to define the invention more fully without any intention of limiting the invention to the specific ingredients, proportions, and conditions specified herein. All parts and percentages are by weight unless otherwise indicated. In the below examples the use of the nitrogen-containing salt catalyst is indicated. However, it will be realized that the strong inorganic acid salts of magnesium, zinc, and tertiary amines can be employed either in place thereof, or in admixture therewith, in the manner indicated hereinabove.

Examples 1–5

Five aqueous resin solutions were prepared in accordance with the instant invention, employing the various components and present in the proportions set forth below in the table. Five cloth samples as defined in the table were each weighed, impregnated with the indicated aqueous resin solution, and then re-weighed to determine the percent wet-pickup. The wet cloth samples were each heated for the indicated periods of time.

The tear strength was determined in accordance with the procedure of the Elmendorf Tear Test, Federal Specification CCC–T–191b No. 5132.

Each resin coated cloth sample was subjected to the standard char test in accordance with the procedure of the American Association of Textile Chemists and Colorists, Test AATCC Base 34–1952. In this test a strip of cloth to be tested is placed on each of its long sides in a vertical position leaving an exposed area of approximately ten inches by two and one-quarter inches. A Bunsen burner is positioned below the bottom of the cloth so that the top of the burner is about three-quarters of an inch from the cloth, and so that the burner produces a flame which is about one and one-half inches high. The flame is produced by burning natural gas in the absence of air. The cloth is exposed to the flame for a period of twelve seconds and the flame is then turned off. The cloth is then removed from the securing means, and a weight is attached to one side of the char, the weight being equivalent to about ten percent of the tear strength of the cloth. The opposite side of the cloth is then pulled to produce a tear along the char. The length of the tear is then measured to determine the char in inches.

The one-quarter inch match test is conducted by taking a strip of cloth ten inches long and one-quarter of an inch wide, extending it vertically in a draft-free chamber, and applying a match to the bottom of the strip for a maximum of six seconds or until the cloth is ignited. The char length thereby produced is then measured and expressed in units of inches.

In Examples 1–5 the resin-coated cloth samples were boiled in an aqueous solution of about 0.2 percent soap and about 0.2 percent sodium carbonate for the length of time indicated in the table, and then dried and subjected to the standard char and one-quarter inch strip test. The results of these tests are set forth along with the other test values in the following table.

In forming the aqueous polymerizable solutions, water is added in sufficient amounts to make up one hundred parts by weight of the aqueous polymerizable solutions.

quite satisfactory and the hand in general improved over the untreated, unimpregnated cloth. The tensile strength of the treated cloth samples was at least as good as that of the untreated samples.

The excellent retention of overall balanced properties which the present compositions display despite repeated launderings for relatively long periods under rather severe conditions is, at least in part, attributable to the fact that these resinous compositions combine chemically by reacting with the functional hydroxyl groups on the cellulose fibers to chemically bond the impregnating resin to the cellulosic fabric.

While the invention has been set forth with particularity in the foregoing specification, it will be realized that the invention in its broadest aspects is not limited to the particular reactants, conditions, and materials set forth therein.

We claim:

1. A process for preparing a flame-retardant cellulosic material which comprises impregnating the cellulosic material with an aqueous resin-forming solution which comprises (1) a tetrakis(α-hydroxyorgano)phosphonium chloride compound of the formula

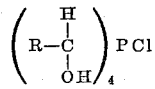

wherein R is selected from the group consisting of hydrogen, lower alkyl groups having between about 1 and about 3 carbon atoms, chlorinated lower alkyl groups having between about 1 and about 3 carbon atoms, lower alkenyl groups having between about 2 and about 3 carbon atoms; and chlorinated lower alkenyl groups having between about 2 and about 3 carbon atoms, (2) a water-soluble cyclic nitrogen-containing compound selected from the group consisting of water-soluble triazines and dimethylol-cyclic alkylene ureas, (3) a sulfite compound capable of combining with an aldehyde, (4) thiourea, and (5) a cataylst salt selected from the group consisting of (A) a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, (B) a strong inorganic acid salt of a material selected from the group consisting of: magnesium, zinc, and tertiary amines, and (C) mixtures of (A) and (B), heating the thus-impregnated cellulosic material whereby polymerization of the substituents (1), (2), (4), and (5), is effected and there is formed an aldehyde which is prevented from accelerating the polymerization by combination of the

TABLE

| Example | 1 | 2 | 3 | 4 | 5 |
|---|---|---|---|---|---|
| Type cloth | 5 oz. sheeting | 5 oz. sheeting | 5 oz. sheeting | 6 oz. Twill | 4 oz. military twill |
| Percent tetrakis (hydroxymethyl)-phosphonium chloride | 20 | 20 | 20 | 20 | 20 |
| Percent trimethylol melamine | 12.5 | 12.5 | 12.5 | 12.5 | 12.5 |
| Percent Na$_2$SO$_3$ | 14.0 | 14.0 | 14.0 | 14.0 | 14.0 |
| Percent Na$_2$S$_2$O$_5$ | 1.4 | 1.4 | 1.4 | 1.4 | 1.4 |
| Percent thiourea | 2.5 | 5.0 | 7.5 | 10.0 | 10.0 |
| Percent catalyst salt (NH$_4$)$_2$SO$_4$ | 2.5 | 2.5 | 2.5 | 2.5 | 2.5 |
| Percent resin add-on (dry basis) | 21.0 | 22.5 | 21.5 | 20.3 | 26.0 |
| Polymerization period (hrs.) of bath | 6 | 6 | 6 | 6 | 6 |
| Curing time (minutes) | 3 | 3 | 3 | 3 | 3 |
| Char (inches) | 3.6 | 3.6 | 3.5 | 3.8 | 3.4 |
| ¼″ match test | 2.5 | 2.0 | 2.0 | 1.0 | 1.0 |
| Tear strength (grams) | 1,310 | 1,330 | 1,280 | 1,710 | 2,700 |
| Char after 2 hr. boil (inches) | 4.4 | 4.4 | 4.2 | 4.3 | 4.6 |
| ¼″ after 2 hr. boil | 4.5 | 4.0 | 4.3 | 2.0 | 5.0 |
| Char after 4 hr. boil (inches) | 4.5 | 4.7 | 4.5 | 4.1 | [1] ND |
| ¼″ after 4 hr. boil | 5.5 | 5.0 | 4.0 | 1.0 | ND |
| Char after 6 hr. boil (inches) | 5.2 | 5.1 | 5.0 | 4.3 | ND |
| ¼″ after 6 hr. boil | [2] B | B | 5.0 | B | ND |

[1] ND = Not Determined.
[2] B = Burned.

The hand (feel), general durability, and tensile strength of the cloth samples after impregnation was found to be aldehyde with the sulfite substituent (3), and drying and curing the thus-treated cellulosic material.

2. The process of claim 1 wherein said aqueous solution contains between about 1 and about 1.4 moles of said sulfite compound per mole of said phosphonium chloride compound.

3. The process of claim 1 wherein said phosphonium chloride compound is tetrakis(hydroxymethyl)phosphonium chloride.

4. The process of claim 1 wherein said sulfite compound is an inorganic sulfite compound.

5. The process of claim 4 wherein said inorganic sulfite compound is an alkali metal sulfite.

6. The process of claim 5 wherein said alkali metal sulfite compound is sodium sulfite.

7. The process of claim 5 wherein said alkali metal sulfite compound is potassium sulfite.

8. The process of claim 1 wherein said sulfite compound is ammonium sulfite.

9. The process of claim 5 wherein said alkali metal sulfite compound is calcium sulfite.

10. The process of claim 1 wherein said sulfite compound is a tertiary amine sulfite.

11. The process of claim 1 wherein said sulfite compound is triethanolamine-sulfite.

12. The process of claim 1 wherein said nitrogen-containing salt of a strong inorganic acid is ammonium sulfate.

13. The process of claim 1 wherein said water-soluble cyclic nitrogen-containing compound is trimethylolmelamine.

14. The process of claim 1 wherein said strong inorganic acid salt is magnesium chloride.

15. The process of claim 1 wherein said strong inorganic acid salt is zinc nitrate.

16. The process of claim 1 wherein said strong inorganic acid salt is triethanolamine-sulfuric acid.

17. The process of claim 1 wherein said drying of the resin-impregnated material is effected at a temperature of between about 90 and about 110 degrees centigrade, for between about 1 and about 10 minutes, and the curing of the resulting dried, treated cellulosic material is effected at a temperature of between about 120 and between about 150 degrees centigrade for between about 1 and about 10 minutes.

18. The process of claim 1 wherein the treated cellulosic material after drying and curing, contains between about 9 and about 30 percent by weight of resin add-on.

19. The process of claim 1 wherein said cellulosic material is a cellulosic textile.

20. A process for preparing a flame-retardant cellulosic material which comprises impregnating a cellulosic material with an aqueous resin-forming solution of (1) a tetrakis(α-hydroxyorgano)phosphonium chloride compound, (2) a water-soluble cyclic nitrogen-containing compound selected from the group consisting of water-soluble triazines and dimethylolcyclic alkylene ureas, (3) a sulfite compound capable of combining with an aldehyde, (4) thiourea, and (5) a catalyst salt selected from the group consisting of (A) a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, (B) a strong inorganic acid salt of a material selected from the group consisting of magnesium, zinc, and teritary amines, and (C) mixtures of (A) and (B), heating the thus-impregnated cellulosic material whereby polymerization of the substituents (1), (2), (4) and (5), is effected and there is formed an aldehyde which is prevented from accelerating the polymerization by combination of the aldehyde with the sulfite substituent (3), and drying and curing the thus-treated cellulosic material.

21. A process for preparing a flame-retardant cellulosic textile material which comprises contacting the cellulosic textile with an aqueous polymerizable solution containing between about 35 and about 70 percent by weight of water, between about 5 and about 30 percent by weight of tetrakis(hydroxymethyl)phosphonium chloride, between about 5 and about 15 percent by weight of trimethylolmelamine, between about 1 and about 10 percent by weight of thiourea, between about 1 and about 1.4 moles of sodium sulfite per mole of tetrakis(hydroxymethyl)phosphonium chloride, and between about 1 and about 10 percent by weight of ammonium sulfate, heating the thus-treated cellulosic textile material, whereby polymerization of the tetrakis(hydroxymethyl)phosphonium chloride, the trimethylolamine, the thiourea, and the ammonium sulfate is effected and there is formed an aldehyde which is prevented from accelerating the polymerization by combination of the aldehyde with the sodium sulfite, and drying and curing the thus-treated cellulosic textile material.

22. A flame-retardant cellulosic material comprising a cellulosic material impregnated with a resin material comprising the reaction product of (1) a tetrakis(α-hydroxyorgano)phosphonium chloride compound, (2) a water-soluble cyclic nitrogen-containing compound selected from the group consisting of water-soluble triazines and dimethylolcyclic alkylene ureas, (3) a sulfite compound capable of combining with an aldehyde, (4) thiourea, and (5) a catalyst salt selected from the group consisting of (A) a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, (B) a strong inorganic acid salt of a material selected from the group consisting of magnesium, zinc, and tertiary amines, and (C) mixtures of (A) and (B), the reaction of the above substituents resulting in the polymerization of the substituents (1), (2), (4), and (5), with the formation of an aldehyde during the said polymerization, which aldehyde is prevented from accelerating the polymerization by combination of the aldehyde with the sulfite substituent (3).

23. A flame-retardant cellulosic textile material comprising a cellulosic textile material impregnated with a resinous material comprising the reaction product of (1) a tetrakis(α-hydroxyorgano)phosphonium chloride compound of the formula

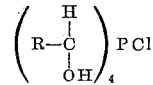

wherein R is selected from the group consisting of hydrogen, lower alkyl groups having between about 1 and about 3 carbon atoms, chlorinated lower alkyl groups having between about 1 and about 3 carbon atoms, lower alkenyl groups having between about 2 and about 3 carbon atoms, and chlorinated lower alkenyl groups having between about 2 and about 3 carbon atoms, (2) a water-soluble cyclic nitrogen-containing compound selected from the group consisting of water-soluble triazines and dimethylolcyclic alkylene ureas, (3) a sulfite compound capable of combining with an aldehyde, (4) thiourea, and (5) a catalyst salt selected from the group consisting of (A) a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, (B) a strong inorganic acid salt of a material selected from the group consisting of magnesium, zinc, and tertiary amines, and (C) mixtures of (A) and (B), the reaction of the above substituents resulting in the polymerization of the substituents (1), (2), (4), and (5), with the formation of an aldehyde during the said polymerization, which aldehyde is prevented from accelerating the polymerization by combination of the aldehyde with the sulfite substituent (3).

24. The textile material of claim 23 wherein the resin add-on is between about 10 and about 30 percent by weight of the treated textile material.

25. The textile material of claim 23 wherein said hydroxyorgano phosphonium chloride compound is tetrakis(hydroxymethyl)phosphonium chloride.

26. The textile material of claim 23 wherein said cyclic nitrogen-containing compound is trimethylolmelamine.

27. The textile material of claim 23 wherein said sulfite compound is an alkali metal sulfite.

28. A cellulosic material treating composition comprising (1) a tetrakis(α-hydroxyorgano)phosphonium chloride compound, (2) a water-soluble cyclic nitrogen-containing compound selected from the group consisting of water-soluble triazines and dimethylolcyclic alkylene ureas, (3) a sulfite compound capable of combining with an aldehyde, (4) thiourea, (5) a catalyst salt selected from the group consisting of (A) a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, (B) a strong inorganic acid salt of a material selected from the group consisting of magnesium, zinc, and tertiary amines, and (C) mixtures of (A) and (B), and (6) water, which composition reacts upon heating to form a polymerization product containing the substituents (1), (2), (4), and (5), and an aldehyde which is prevented from accelerating the polymerization by combination of the aldehyde with the sulfite substituent (3).

29. A cellulosic textile treating composition comprising an aqueous resin-forming solution comprised of (1) a tetrakis(α-hydroxyorgano)phosphonium chloride compound of the formula

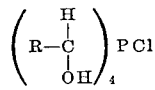

wherein R is selected from the group consisting of hydrogen, lower alkyl groups having between about 1 and about 3 carbon atoms, chlorinated lower alkyl groups having between about 1 and about 3 carbon atoms, lower alkenyl groups having between about 2 and about 3 carbon atoms, and chlorinated lower alkenyl groups having between about 2 and about 3 carbon atoms, (2) a water-soluble cyclic nitrogen-containing compound selected from the group consisting of: water-soluble triazines and dimethylolcyclic alkylene ureas, (3) a sulfite compound capable of combining with an aldehyde, (4) thiourea, (5) a catalyst salt selected from the group consisting of (A) a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, (B) a strong inorganic acid salt of a material selected from the group consisting of: magnesium, zinc, and tertiary amines, and (C) mixtures of (A) and (B), and (6) water, which composition reacts upon heating to form a polymerization product containing the substituents (1), (2), (4), and (5), and an aldehyde which is prevented from accelerating the polymerization by combination of the aldehyde with the sulfite substituent (3).

30. The composition of claim 29 wherein the proportion of said sulfite compound to said phosphonium chloride compound is between about 1 and about 1.4 moles of said sulfite compound per mole of said phosphonium chloride compound.

31. The composition of claim 29 wherein said phosphonium chloride compound is tetrakis(hydroxymethyl)phosphonium chloride.

32. The composition of claim 29 wherein said sulfite compound is an inorganic sulfite.

33. The composition of claim 32 wherein said inorganic sulfite is an alkali metal sulfite.

34. The composition of claim 33 wherein said alkali metal sulfite is sodium sulfite.

35. The composition of claim 29 wherein said catalyst salt is a nitrogen-containing salt of a strong inorganic acid selected from group (A).

36. The composition of claim 35 wherein said nitrogen-containing salt of a strong inorganic acid is ammonium sulfate.

37. The composition of claim 29 wherein said catalyst salt is a strong inorganic acid salt of a material selected from the group consisting of: magnesium, zinc, and tertiary amines.

38. The composition of claim 37 wherein said strong inorganic acid salt is magnesium chloride.

39. The composition of claim 37 wherein said strong inorganic acid salt is zinc nitrate.

40. The composition of claim 37 wherein said strong inorganic acid salt is triethanolamine-sulfuric acid.

References Cited by the Examiner
UNITED STATES PATENTS

| | | | |
|---|---|---|---|
| 2,407,599 | 9/1946 | Auten et al. | 260—29.4 |
| 2,415,113 | 2/1947 | Seymour et al. | 117—137 |
| 2,809,941 | 10/1957 | Reeves et al. | 260—29.4 |
| 2,846,337 | 8/1958 | Cooke et al. | 260—29.4 XR |
| 2,923,644 | 2/1960 | Herbes | 117—136 XR |
| 3,101,278 | 8/1963 | Wagner et al. | 117—137 |
| 3,101,279 | 8/1963 | Wagner et al. | 117—137 |

SAMUEL H. BLECH, *Primary Examiner.*

L. J. BERCOVITZ, M. TILLMAN, *Examiners.*